United States Patent [19]

Vollkommer et al.

[11] 4,078,148

[45] Mar. 7, 1978

[54] POLYETHER ESTERS

[75] Inventors: Norbert Vollkommer, Troisdorf; Hermann Richtzenhain, Schwellenbach Post Marialinden; Gerhard Bier; Manfred Gorlitz, both of Troisdorf, all of Germany

[73] Assignee: Dynamit Nobel Aktiengesellschaft, Cologne, Germany

[21] Appl. No.: 405,235

[22] Filed: Oct. 10, 1973

[30] Foreign Application Priority Data

Oct. 13, 1972 Germany .............................. 2250223

[51] Int. Cl.$^2$ ............................................. C07C 69/66
[52] U.S. Cl. ................................... 560/185; 260/867; 260/75 R

[58] Field of Search ........................ 260/484 R, 484 A

[56] References Cited

U.S. PATENT DOCUMENTS 2,917,410  12/1959  Vitalis .............................. 260/484 R

*Primary Examiner*—Paul J. Killos
*Attorney, Agent, or Firm*—Burgess, Dinklage & Sprung

[57] ABSTRACT

Polyether ester polymers of tetrahydrofuran and γ-butyrolactone or hexamethyleneoxide and γ-butyrolactone. The polymers are prepared by contacting the mentioned monomers in the presence a fluoride or chloride of antimony or a chloride of tin or titanium. The polymers can be used as components in the preparation of polyurethanes.

18 Claims, 1 Drawing Figure

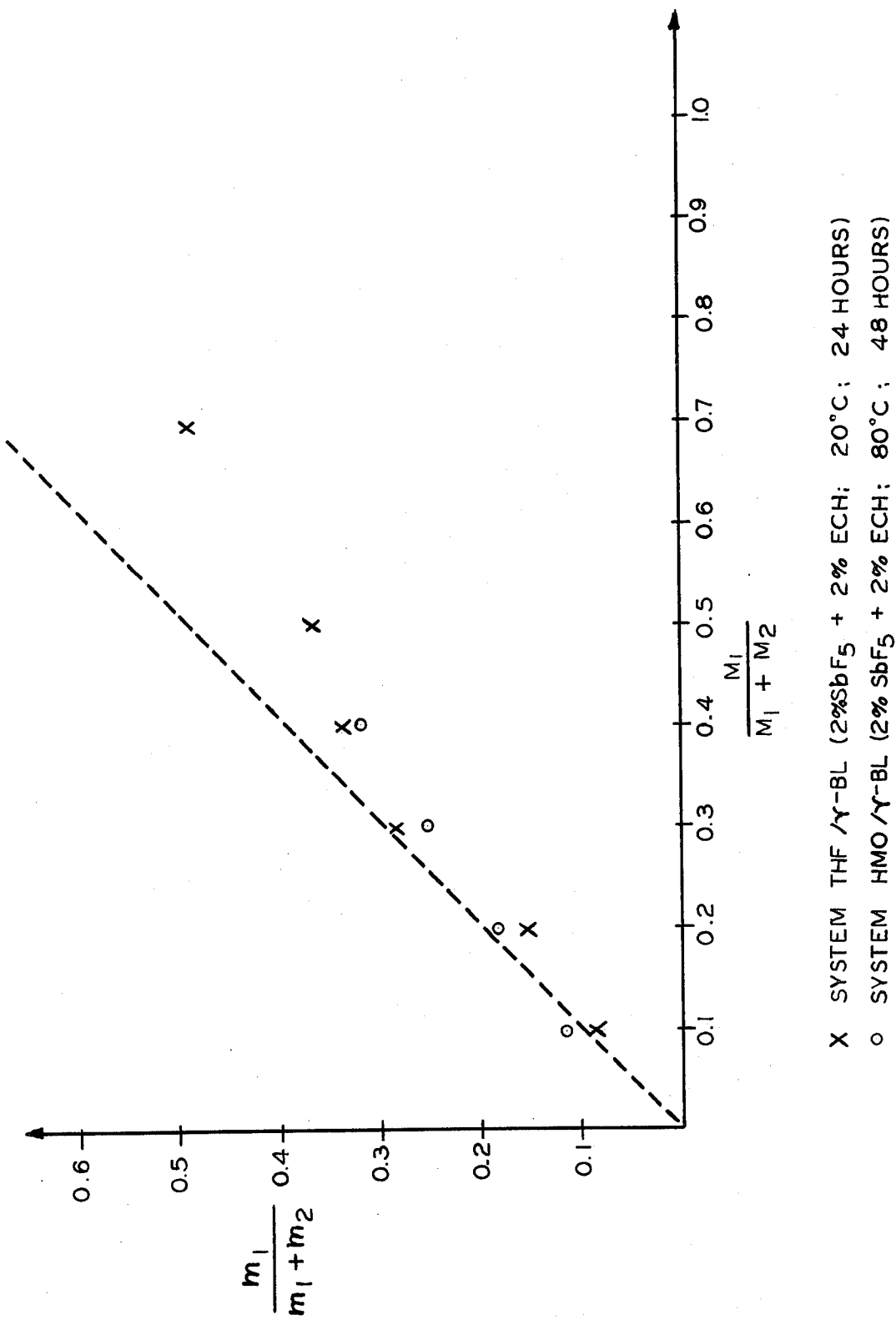

POLYETHER ESTERS

The invention relates to copolymers of tetrahydrofuran (THF) and γ-butyrolactone (γ-BL) and copolymers of hexamethylene oxide (HMO) and γ-BL, which may be described by the following formulas:

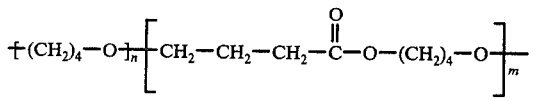

and

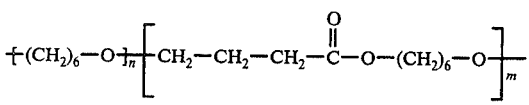

In Formulas I and II, $n$ and $m$ represent positive whole numbers; the ratio of $n$ to $m$ may be between 100 : 1 and 1 : 100, and the sum of $n$ plus $m$ may assume values between 2 and 1000.

The fundamental building blocks of the copolymers have a random arrangement; there is reason, however, to suppose that, insofar as possible, a γ-BL building block is followed by a THF or HMO building block, as the case may be.

For the sum of $n$ plus $m$, values of 4 to 250 are preferred.

Copolymers between cyclic ethers and lactones have already been prepared. In the copolymerization of cyclic ethers with lactones, however, the number of cyclic members in the two monomers is of great importance; for example, although it is not difficult to copolymerize epoxides or oxacyclobutane with β-propiolactone, δ-valerolactone or ε-caprolactone by means of cationic initiators (H. Cherdron and H. Ohse, "Makromolekulare Chem." 92 (1966)), p. 213, and Y. Yamashita, "Macromolecules," Vol. 2, No. 6 (1969) p. 613), copolymers of THF and β-propiolactone, δ-valerolactone and ε-caprolactone are much harder to obtain. For example, Cherdron and Ohse ("Makromolekulare Chem." 56, 179 (1962)), by the polymerization of 4-, 6- and 7-member lactones with cationic initiators such as trifluoroacetic acid or acetyl perchlorate in tetrahydrofuran as solvent, apparently obtained pure polyesters, not copolymers. Also, as our own experiments have shown, an attempt to copolymerize THF with pivalolactone using BF$_3$-etherate as initiator has yielded virtually pure polytetramethylene oxide.

U.S. Pat. No. 3,442,867 claims a process for the copolymerization of THF with the 4-, 6- and 7-member lactones, β-propiolactone, o-valerolactone and ε-caprolactone using initiators containing arsenic, but copolymers of THF or HMO with the 5-member γ-BL have not been described. The reason for this lies in the extremely poor copolymerization tendency of γ-BL. Homopolymers have not yet been obtained, and also the list of monomers capable of forming copolymers with γ-BL is very short; these monomers include trioxane and 3,3-bis-(chloromethyl)-oxacyclobutane (BCMO) (Brit. Pat. 926,904, and K. Ito, "Makromolekulare Chem." 139, 153 (1970), respectively). Trioxane and BCMO, however, are known to be strongly inclined to form copolymers and are capable of forming copolymers even with vinyl monomers under the influence of cationic initiators (Minoura, "Makromolekulare Chem." 119, 86 (1968) and Higashimura, "J. Polymer Sci." A-1, 7 (1969) No. 4, 1115, respectively).

Difficulty occurs, however, even in the copolymerization of γ-BL with its ring-homologous lactones; the copolymerization parameters are unfavorable, and low transformations are achieved. Thus Tada et al., in attempts to copolymerize γ-BL with β-propiolactone, setting out from a monomer mixture containing 30 mole-% γ-BL, obtained a copolymer which contained only 3 mole-% γ-BL building blocks. The polymerization rate was extremely low: 2.87% in 3 days of polymerization time (K. Tada et al., "Makromolekulare Chem." 77, 220 (1964)). The copolymerization of γ-BL with glycolide produces similarly negatives results; although copolymers with β-propiolactone were obtained with the use of antimony trifluoride as initiator, copolymers of γ-BL and glycolide could not be made (K. Chujo et al., "Makromolekulare Chem." 100, 262 (1967).

Although under these circumstances it was rather improbable that γ-BL would form copolymers with THF or even with HMO, nevertheless cationic copolymerization experiments were undertaken. The fact that no polymer was obtained with a series of cationic initiators such as trifluoracetic acid, acetyl perchlorate, BF$_3$-etherate, BF$_3$-etherate plus epichlorhydrine and aluminum monoethyl dichloride, appeared to confirm the original doubts. It was all the more amazing, therefore, that, in the presence of antimony pentafluoride or antimony pentachloride as initiators, random copolymers with high percentages of γ-BL building blocks were obtained at high transformation rates from the monomer pairs γ-BL/THF and γ-BL/HMO.

The copolymers are waxy or plastic masses or highly viscous oils, depending on the content of γ-BL building blocks. The softening temperatures decrease as the percentage of γ-BL building blocks increases. If, for example, poly-HMO has a melting point of 72° C (differential thermoanalysis), the melting temperature of a copolymer containing 24 mole-% γ-BL building blocks is 50° C and that of a copolymer containing 31 mole-% γ-BL building blocks is 38° C. Whereas poly-HMO and poly-THF represent highly crystalline polymers, the crystalline content diminishes as the γ-BL content increases.

The copolymers have mostly OH end groups and thus may be used preferentially as diol components in the preparation of polyurethane. Another possible application is in the field of elasticizing agents or polymer plastizisers e.g., for plastics.

The THF/γ-BL copolymers show the C=O valence vibration of the γ-BL building block at 1730 cm$^{-1}$ i the infrared spectrum, the C-O valence vibration (ester) of the γ-BL building block at 1165 cm$^{-1}$, and the C-O valence vibration (ether) of the THF building block at 1100 cm$^{-1}$.

The NMR spectrum of the THF/γ-BL copolymer (100 MHz measuring frequency; solvent CDCl$_3$; room temperature) shows signals which may be associated with the following fragments of the polyether ester chain:

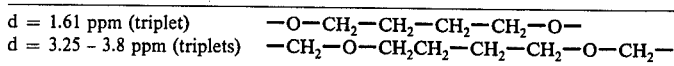

| | |
|---|---|
| d = 1.87 ppm (pentet) | $-O-CH_2-CH_2-CH_2-\underset{\underset{O}{\|}}{C}-O-$ |
| d = 2.39 ppm (triplet) | $-O-CH_2-CH_2-CH_2-\underset{\underset{O}{\|}}{C}-O-$ and |
| d = 4.08 ppm (triplet) | $-O-CH_2-CH_2-CH_2-\underset{\underset{O}{\|}}{C}-O-CH_2-$ |

Under the same conditions of measurement, the NMR spectrum of the HMO/γ-BL shows signals which may be associated with the following fragments of the chain:

| | |
|---|---|
| d = 1.13 – 1.73 ppm (multiplet)<br>d = 3.2 – 3.7 ppm (triplets)<br>d = 1.79 ppm (pentet) | $-O-\underline{CH_2}-(CH_2)_4-\underline{CH_2}-O-$<br>$-\underline{CH_2}-O-\underline{CH_2}-(CH_2)_4-\underline{CH_2}-O-CH_2-$<br>$-O-CH_2-\underline{CH_2}-CH_2-\underset{\underset{O}{\|}}{C}-O-$ |
| d = 2.29 ppm (triplet) | $-O-CH_2-CH_2-\underline{CH_2}-\underset{\underset{O}{\|}}{C}-O-$ and |
| d = 3.99 ppm (triplet) | $-O-CH_2-CH_2-CH_2-\underset{\underset{O}{\|}}{C}-O-\underline{CH_2}-.$ |

The presence of a copolymer may be deducted from the presence of signals of the cyclic ether building block and of the lactone building block if one considers that under the conditions of the reaction a homopolymerization of the γ-BL can be excluded. The clear solution which can be obtained from the polymers also speak for the presence of a copolymer; polymer mixtures would yield turbid, cloudy solutions as a result of incompatibility phenomena. Proof of the presence of random copolymers is to be found in hydrolytic decomposition testing of the products in a alkaline medium, which leads to the formation of oligomers. A copolymer of HMO and γ-BL containing 24 mole-% of γ-BL building blocks with a molecular weight of 4500 can in this manner by hydrolyzed to oligomers of the HMO with an average molecular weight $\bar{M}n$ (vapor pressure osmometer) of 430. Such behavior would not be reconcilable with the presence of a polymer mixture or of a block copolymer.

The fluorides and chlorides of trivalent and especially pwentavalent antimony serve as cationic initiators to start the copolymerization, as do the chlorides of tetravalent tin and titanium. Antimony pentafluoride is an especially preferred initiator. Other chlorides of tin and antimony can be used.

The initiators are used in amounts of between 0.1% and 10%, preferably 0.5% and 5%, of the weight of the monomer mixture. To increase the speed of copolymerization it is advantageous to add to the batches small amounts of epichlorhydrine (ECH) of the order of magnitude of the amounts of initiator. The acceleration that can be achieved thereby is especially apparent in the rate of copolymerizaton of the HMO/γ-BL monomer pair which is appreciably slower than that of the THF/γ-BL combination.

The copolymerization is preferably performed in the absence of solvents; it is also possible, however, to polymerize in the presence of largely water-free organic solvents such as aromatic hydrocarbons or halogenated aromatic or aliphatic hydrocarbons.

The polymerization temperature is between −100° C and +150° C, the copolymerization of the THF/γ-BL system being performed between −70° C and +70° C, especially between 0° C and 50° C, while the copolymerization of the HMO/γ-BL system is performed preferably between 20° C and 120° C, especially between 50° C and 100° C.

The transformations achievable in the polymerization time of from a few hours to 48 hours are amazingly high considering the poor polymerization tendency of γ-BL, and they are between 60% and 80% by weight of the monomers used in the batches containing up to 30 mole-% γ-BL in the monomer mixture. In the case of the HMO/γ-BL system the copolymerization percentages in batches containing up to 30 mole-% γ-BL in the monomer mixture are even higher than the percentages achievable under the same polymerization conditions in the homopolymerization of HMO.

The proportion of the γ-BL building blocks incorporated into the copolymer is great, considering the poor tendency of the monomer to form homopolymers. FIG. 1 shows the mole-fraction $m_1/(m_1 + m_2)$ of the γ-BL building blocks (γ-BL = $M_1$) in relation to the proportion ($M_1/(M_1 + M_2)$) of the monomer put into the batch, wherein the subscript 1 is for γ-BL or building blocks therefrom. and subscript 2 is for THF or HMO or the corresponding building blocks. It is not, however, a copolymerization diagram since the mole fractions $m_1/(m_1 + m_2)$ have been determined at high copolymerization rates.

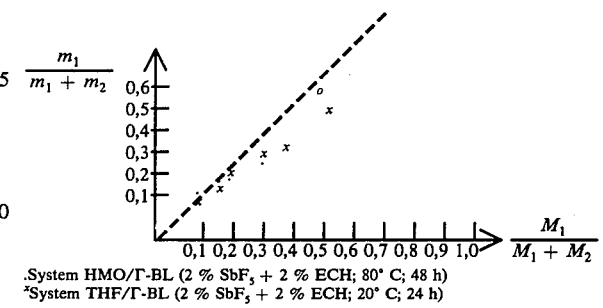

.System HMO/Γ-BL (2 % SbF$_5$ + 2 % ECH; 80° C; 48 h)
ˣSystem THF/Γ-BL (2 % SbF$_5$ + 2 % ECH; 20° C; 24 h)

SUMMARY

Thus, the invention provides polyether ester polymers of the formulas:

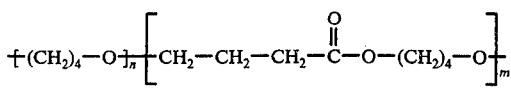

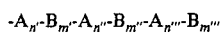

wherein A is —(CH$_2$)$_4$—O— and B is

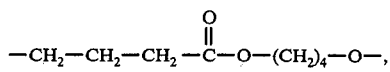

and wherein the n's and the m's in the sets n', m'; n", m"; n''', m''', . . . are zero or positive whole numbers, alike or different; and the sum of n' + m' + n" + m" + n''' + m''' . . . is 2–1000.

Polymer (II) can be similarly and likewise represented with A being —(CH$_2$)$_6$—O—.

The products of the invention are the ring opening addition polymerization products of THF and γ-BL or HMO and γ-BL. The molar proportion of THF or HMO building blocks to γ-BL building blocks in the polymers is in the range of 200:1 to 1:1, preferably 20:1 to 1:1. The molecular weight (vapor pressure osmometer) can be in the range of 260 to 180,000, preferably 500 to 50,000.

The polymers are prepared by contacting THF and γ-BL, or HMO and γ-BL in the presence of a fluoride or chloride of antimony or a chloride of tin or titanium. The end groups of the copolymers mostly are OH-groups formed by OH-groups of added water, which is used for purpose of stopping polymerization by interruption of the growth of the polymer chain. The OH-group is the end group when TMF- or HMO-building blocks form the end of a polymer chain.

In minor amount carboxyl end groups are the end groups, also formed by means of OH of added water. The carboxyl-group is the end group when γ-BL-building blocks form the end of a polymer chain (in which case the carbonyl-cation

of the lactone reacts with OH of water used to stop the polymerization).

As thus polymeric diols and in minor amount polymeric α,ω-hydroxy-carboxylic acids respectively polymeric α,ω-dicarboxylic acids are formed in case of both end groups the polymers of the invention are useful components in preparation of polyurethanes.

EXAMPLE 1

In a polymerization vessel provided with a stirrer and a gas feed tube there are placed, under a nitrogen atmosphere, 140 g (1.4 moles) of HMO and 51.6 g (0.6 mole) of γ-BL. Both monomers were dried over CaH$_2$ and distilled. The molar ratio of HMO to γ-BL is 70:30. With stirring, 4 g of ECH and then 4 g of SbF$_5$ (approx. 2 wt-%) are added drop by drop at room temperature. The mixture is heated to the polymerization temperature of 80° C and the stirrer is shut off. After 48 hours the polymerization is discontinued, the stiffened mixture is dissolved in aqueous dioxane, and the polymer is precipitated in methanol. For refinement it is reprecipitated from THF/methanol and dried in vacuo until the weight becomes constant. 140.4 g of a virtually colorless copolymer is obtained with a reduced specific viscosity of 0.44 measured in THF (0.5% solution; 25° C). The transformation amounts to 73.5% by weight.

The NMR spectrum (measuring frequency of 100 MHz; solvent; CDCl$_3$ room temperature) shows signals at d = 1:13–1.73 ppm (multiplet), d = 3.2–3.7 ppm (triplets), d = 1.79 ppm (pentet), d = 2.29 ppm (triplet) and d = 3.99 ppm (triplet), which prove the presence of HMO and γ-BL building blocks. From the intensity of the CH$_2$ signal of the γ-BL building block at d = 2.29 ppm and the sum of the intensities of the CH$_2$ signals at d = 1.13–1.73 ppm and d = 1.79 ppm of the HMO and γ-BL building block, respectively, the percentage of the γ-BL building blocks in the copolymer was determined by ratio and proportion. It amounts to 24 mole-%. The molecular weight, measured in the vapor pressure osmometer, amounts to 4500; the OH number is 21.

The copolymer is soluble in a number of organic solvents, such as acetone, chloroform, methylene chloride, THF, dioxan, acetic acid ethyl ester and benzene. It is insoluble in water, alcohols and aliphatic hydrocarbons.

Differential thermoanalysis shows a strong endothermal peak at 50° C, which corresponds to the melting temperature. On the thermobalance (air; heating rate 8° C/min) the copolymer had the following weight losses: 1% at 230° C; 5% at 285° C and 10% at 324° C.

Similar results were obtained at polymerization temperatures of 65° and 88° C, respectively.

EXAMPLES 2, 3 AND 4

Under the same procedure as in Example 1, HMO was copolymerized with γ-BL in a variety of proportions. The polymerization temperature was 80° C, the time 48 hours. 2% SbF$_5$ serves as the initiator together with 2% ECH. The results are summed up in the following table.

| HMO (g) | γ-BL (g) | Molar ratio HMO/γ-BL | Copolymer (g) | Transformation (%)** | γ-BL building blocks (mole-%) | OH No. | $M_n$* |
|---|---|---|---|---|---|---|---|
| 90 | 8.62 | 90:10 | 68.5 | 69.5 | 12 | 18 | 6000 |
| 80 | 17.2 | 80:20 | 77.9 | 80 | 17.7 | 32 | 2700 |
| 60 | 34.4 | 60:40 | 30.3 | 32 | 30.8 | 52 | 1600 |

*Vapor pressure osmometer.
**by weight

EXAMPLE 5

21 g (0.21 mole) of HMO and 7.8 g (0.09 mole) of γ-BL are placed under a nitrogen atmosphere in a polymerization vessel equipped with stirrer and gas feed tube, and 1.15 g of SnCl$_4$ was added with stirring. The molar ratio of HMO : γ-BL is 70 : 30 and the initiator concentration is 4% by weight.

The mixture is heated to the polymerization temperature of 80° C and let stand for 3 days at this temperature with the stirrer shut off.

The highly viscous mixture is precipitated by pouring it into aqueous methanol and for refinement it is reprecipitated from THF/methanol. After drying, 10.7 g of a copolymer was obtained containing 22.6 mole-% γ-BL building blocks. The transformation is 37% by weight. The molecular weight is 2300 and the OH number is 40.

EXAMPLE 6

25.2 g (0.35 mole) THF and 12.8 g (0.15 mole) γ-BL are placed in a polymerization vessel under a nitrogen atmosphere and 0.8 g of ECH is added, followed by 0.8 g of SbF$_5$, with stirring. The molar ratio of THF to γ-BL is 70 : 30 and the initiator concentration (SbF$_5$) is about 2% by weight. The stirrer is shut off and the mixture is let stand at room temperature for 24 hours.

The stiffened mixture is dissolved in aqueous THF and the polymer is precipitated in methanol. For refinement it is reprecipitated from dioxan in a methanol-water mixture. After drying, 24.1 g of a copolymer was obtained. The transformation is 63.4%. As the basis for the computation of the percentage of γ-BL in the copolymer, the intensity of the γ-BL signal at $d = 2.39$ ppm was related to the sum of the intensities of the THF and γ-BL signals at $d = 1.87$ ppm and $d = 1.61$ ppm, respectively. On this basis the percentage of γ-BL building blocks is determined to be 28 mole-%.

The molecular weight, determined with the vapor pressure osmometer, amounts to 5500 and the OH number is 16. Differential thermoanalysis shows a strong endothermal peak at 39° C, which is the melting temperature. The weight loss on the thermobalance (air; heating rate 8° C/min) amounts to 1% at 228° C; 5% at 272° C and 10% at 316° C.

EXAMPLE 7 TO 11

Under the same conditions of procedure as in Example 6, THF was copolymerized with various amounts of γ-BL. The reaction temperature is 20° C; the polymerization time is 24 h. 2% SbF$_5$ + 2% ECH served as the initiator system in Examples 7, 8, and 9, and 4% SbF$_5$ + 4% ECH in Examples 10 and 11. The results are summarized in the following table:

| THF (g) | γ-BL (g) | Molar ratio THF: γ-BL | Copolymer (g) | Transformation (%)[3] | γ-BL[1] building blocks (mole-%) | OH No. | Mn[2] |
|---|---|---|---|---|---|---|---|
| 36   | 4.27 | 90:10 | 26.5 | 57 | 8.1  | 14 | 7000 |
| 28.8 | 8.5  | 80:20 | 23.6 | 63 | 14.6 | 17 | 5500 |
| 21.6 | 17.1 | 60:40 | 14.7 | 38 | 32.3 | 58 | 1500 |
| 18.0 | 21.7 | 50:50 | 9.9  | 25 | 35.6 | 62 | 1350 |
| 10.8 | 29.7 | 30:70 | 11.5 | 28 | 49.4 | 56 | 1200 |

[1]Quantitative NMR spectroscopy as in Example 6
[2]Vapor pressure osmometer
[3]by weight The copolymer of Example 10 (35.6 mole-% γ-BL building blocks) is semisolid; the copolymer of Example 11 (49.4 mole-% γ-BL building blocks) is a highly viscous oil.

EXAMPLE 12

25.2 g (0.35 mole) THF and 12.8 g (0.15 mole) γ-BL are placed in a polymerization vessel under a nitrogen atmosphere and 1.5 g of SbCl$_5$ is added with stirring. The molar ratio of THF to γ-BL is 70 : 30 and the initiator concentration is about 4 wt-%. The mixture is heated to the polymerization temperature of 35° C and the stirrer is shut off. After 24 hours the polymerization is interrupted and the viscous mixture is poured into methanol to precipitae the copolymer. For refinement it was reprecipitated from dioxan into a mixture of methanol and water.

After drying, 13.4 g of a copolymer containing 21 mole-% γ-BL building blocks was obtained. The transformation is 35% by weight. The molecular weight of the copolymer amounts to 2400.

In Examples 1–4, and 6–11, wherein the system is HMO or THF and SbF$_5$, SbF$_3$ can be substituted for SbF$_5$, with comparable results, though the results are better with SbF$_5$.

In Example 5, wherein the system is HMO and SnCl$_4$, THF can be substituted for HMO, with comparable results. Also in that example, for either HMO or THF, TiCl$_4$ can be used in place of SnCl$_4$, with comparable results.

In Example 12, wherein the system is THF and SbCl$_5$, HMO can be substituted for THF with comparable results. Also for either THF or HMO, SbCL$_3$ can be substituted for SbCl$_5$ with comparable results, though the results are better with SbCl$_5$.

Other chlorides of tin or titanium can be used in place of SnCl$_4$ and TiCl$_4$, respectively.

What is claimed is:

1. Process for the preparation of a polymer which is the addition polymerization product of tetrahydrofuran and γ-butyrolacetone (I), or hexamethyleneoxide and Γ-butyrolactone (II), comprising contacting tetrahydrofuran and γ-butyrolactone for (I), or hexamethyleneoxide and γ-butyrolactone (II), in the presence of an initiator, said initiator being a fluoride or chloride of antimony or a chloride of tin or titanium, in an amount sufficient to initiate the addition polymerization, and conducting said contacting at a temperature and for a time sufficient for the addition polymerization.

2. Process according to claim 1, wherein the addition polymerization product is of tetrahydrofuran and γ-butyrolactone.

3. Process according to claim 1, wherein the addition polymerization product is of hexamethyleneoxide and γ-butyrolactone.

4. Process according to claim 1, the temperature being −100° C to 150° C.

5. Process according to claim 2, the temperature being −70° C to 70° C.

6. Process according to claim 3, the temperature being 20° C to 120° C.

7. Process according to claim 1, said initiator being at least one of SbCl$_5$, SbF$_5$, SbCl$_3$, SbF$_3$, SnCl$_4$, and TiCl$_4$.

8. Process according to claim 7, the initiator being present in amount of 0.1 – 10 wt.% with reference to the weight of the monomers.

9. Process according to claim 8, and conducting said contacting in the presence of epichlorohydrin in an amount sufficient to accelerate the reaction.

10. Process according to claim 2, said initiator being at least one of SbCl$_5$, SbF$_5$, SbCl$_3$, SbF$_{3, SnCl4}$, and TiCl$_4$.

11. Process according to claim 3, said initiator being at least one of SbCl$_5$, SbF$_5$, SbCl$_3$, SbF$_3$, Sn Cl$_4$ and TiCl$_4$.

12. Process according to claim 10, wherein the initiator is SbF$_5$ or SbCl$_5$.

13. Process according to claim 11, wherein the initiator is SbF$_5$ or SbCl$_5$.

14. Product produced by the process of claim 2.

15. Product produced by the process of claim 3.

16. Process according to claim 3, and conducting said contacting in the presence of epichlorohydrin in an amount sufficient to accelerate the reaction.

17. Process according to claim 1, wherein the mole ratio of tetrahydrofuran and γ-butyrolactone, or hexamethyleneoxide and γ-butyrolactone is such that the corresponding mole ratio in the polymer is in the range of 200:1 to 1:1.

18. Process according to claim 4, wherein the mole ratio of tetrahydrofuran and γ-butyrolactone, or hexamethyleneoxide and γ-butyrolactone is such that the corresponding mole ratio in the polymer is in the range of 200:1 to 1:1.

* * * * *

UNITED STATES PATENT AND TRADEMARK OFFICE
CERTIFICATE OF CORRECTION

PATENT NO. : 4,078,148

DATED : March 7, 1978

INVENTOR(S) : Norbert Vollkommer, Hermann Richtzenhain, Gerhard Bier and Manfred Gorlitz It is certified that error appears in the above-identified patent and that said Letters Patent are hereby corrected as shown below:

Column 2, line 54, change "i" to --in--.

Column 3, line 46, correct the spelling of "pentavalent".

Column 8, line 19, (claim 1, line 4), change "Γ" to --γ--.

UNITED STATES PATENT AND TRADEMARK OFFICE
CERTIFICATE OF CORRECTION

PATENT NO. : 4,078,148
DATED : March 7, 1978
INVENTOR(S) : Norbert Vollkommer, Hermann Richtzenhain, Gerhard Bier and Manfred Gorlitz It is certified that error appears in the above-identified patent and that said Letters Patent are hereby corrected as shown below:

The table bridging columns 2 and 3, cancel the table and substitute:

| | |
|---|---|
| $d = 1.61$ ppm (triplet) | $-O-CH_2-\underline{CH_2}-\underline{CH_2}-CH_2-O-$ |
| $d = 3.25 - 3.8$ ppm (triplets) | $-\underline{CH_2}-O-\underline{CH_2}CH_2-CH_2-\underline{CH_2}-O-\underline{CH_2}-$ |
| $d = 1.87$ ppm (pentet) | $-O-CH_2-\underline{CH_2}-CH_2-\overset{O}{\overset{\|}{C}}-O-$ |
| $d = 2.39$ ppm (triplet) | $-O-CH_2-CH_2-\underline{CH_2}-\overset{O}{\overset{\|}{C}}-O-$ and |
| $d = 4.08$ ppm (triplet) | $-O-CH_2-CH_2-CH_2-\overset{O}{\overset{\|}{C}}-O-\underline{CH_2}-$ |

UNITED STATES PATENT AND TRADEMARK OFFICE
CERTIFICATE OF CORRECTION

PATENT NO. : 4,078,148

DATED : March 7, 1978

INVENTOR(S) : Norbert Vollkommer, Hermann Richtzenhain, Gerhard Bier and Manfred Gorlitz It is certified that error appears in the above-identified patent and that said Letters Patent are hereby corrected as shown below:

The complete table in column 3, cancel the table and substitute:

d = 1.13-1.73 ppm (multiplet)   -O-CH$_2$-(CH$_2$)$_4$-CH$_2$-O- d = 3.2-3.7 ppm (triplets)   -CH$_2$-O-CH$_2$-(CH$_2$)$_4$ -CH$_2$-O-CH$_2$- d = 1.79 ppm (pentet)   $-O-CH_2-CH_2-CH_2-\overset{\overset{O}{\|}}{C}-O-$ d = 2.29 ppm (triplet)   $-O-CH_2-CH_2-\underline{CH_2}-\overset{\overset{O}{\|}}{C}-O-$   and d = 3.99 ppm (triplet)   $-O-CH_2-CH_2-CH_2-\overset{\overset{O}{\|}}{C}-O-\underline{CH_2}-$.

Column 4, lines 53-64, cancel those lines.

Column 5, lines 5 and 6, between those lines insert:

and

UNITED STATES PATENT OFFICE
CERTIFICATE OF CORRECTION

Patent No. 4,078,148   Dated March 7, 1978

Inventor(s) Norbert Vollkommer et al.

It is certified that error appears in the above-identified patent and that said Letters Patent are hereby corrected as shown below:

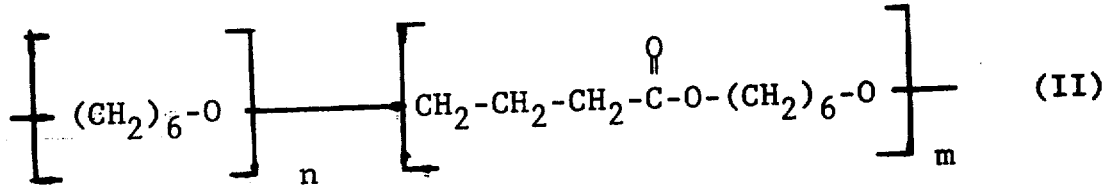

wherein n and m are positive whole numbers. The n's in the polymer and the m's in the polymer are alike or different. Desirably for each building block of formula (I) in the polymer or for each building block of formula (II) in the polymer, the ratio n:m is between 100:1 and 1:100, and the sum $n + m$ is between 2 and 1000.

Polymer (I) can also be represented as :

Signed and Sealed this

Fifteenth Day of August 1978

[SEAL]

Attest:

RUTH C. MASON  
Attesting Officer

DONALD W. BANNER  
Commissioner of Patents and Trademarks